United States Patent
Cha (10) Patent No.: US 11,611,641 B2
(45) Date of Patent: Mar. 21, 2023

(54) MOBILE TERMINAL (71) Applicant: LG Electronics Inc., Seoul (KR)

(72) Inventor: Youngdo Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/189,961

(22) Filed: Mar. 2, 2021

(65) Prior Publication Data
US 2022/0182471 A1 Jun. 9, 2022

(30) Foreign Application Priority Data

Dec. 7, 2020 (WO) ................ PCT/KR2020/017728

(51) Int. Cl.
*H04B 1/38* (2015.01)
*H04M 1/02* (2006.01)
*G06F 1/16* (2006.01)

(52) U.S. Cl.
CPC .......... *H04M 1/022* (2013.01); *G06F 1/1652* (2013.01); *G06F 1/1681* (2013.01); *H04M 1/0268* (2013.01)

(58) Field of Classification Search
CPC ............ H04M 1/0214; H04M 1/0216; H04M 1/0218; H04M 1/022; H04M 1/0225; H04M 1/0233; H04M 1/0247; G06F 1/1652; G06F 1/1681
See application file for complete search history.

(56) References Cited

U.S. PATENT DOCUMENTS

| | | | | |
|---|---|---|---|---|
| 10,480,225 B1 | * | 11/2019 | Hsu | ............................ E05D 3/12 |
| 2020/0081487 A1 | | 3/2020 | Lin | |
| 2020/0293094 A1 | | 9/2020 | Liu | |
| 2020/0355216 A1 | * | 11/2020 | Bae | ......................... F16C 11/04 |

FOREIGN PATENT DOCUMENTS

| | | |
|---|---|---|
| CN | 109404411 | 3/2019 |
| EP | 3109847 | 12/2016 |
| KR | 100949839 | 3/2010 |
| KR | 101452871 | 10/2014 |
| KR | 20150142290 | 12/2015 |
| WO | WO2020186890 | 9/2020 |

OTHER PUBLICATIONS

Extended European Search Report in European Appln. No. 21160917.7, dated Dec. 22, 2021, 14 pages.
International Search Report and Written Opinion in International Appln. No. PCT/KR2020/017728, dated Sep. 1, 2021, 20 pages (with English translation).

* cited by examiner

Primary Examiner — Tuan Pham
(74) Attorney, Agent, or Firm — Fish & Richardson P.C.

(57) ABSTRACT

A mobile terminal includes: a first body, a second body rotatable relative to the first body, a flexible display disposed on the first body and the second body, and a hinge assembly adjusting the first body and the second body to (i) a first state in which the first body and the second body are disposed in parallel to each other or (ii) a second state in which the first body and the second body are disposed to face each other. The hinge assembly includes body rotators spaced apart from each other in a width direction of the first body, a support bridge disposed between the body rotators to connect each of the body rotators, and a display support disposed to overlap with the support bridge in a width direction of the first body and configured to be movable in connection with a movement of the support bridge.

18 Claims, 9 Drawing Sheets

MOBILE TERMINAL

CROSS-REFERENCE TO RELATED APPLICATIONS

Pursuant to 35 U.S.C. § 119(a), this application claims the benefit of the earlier filing date and the right of priority to International Patent Application No. PCT/KR2020/017728, filed on Dec. 7, 2020, the contents of which is incorporated by reference herein in its entirety.

TECHNICAL FIELD

The present disclosure relates to a mobile terminal including a hinge assembly capable of supporting a rear surface of a flexible display in a foldable mobile terminal.

BACKGROUND

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display module. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In particular, in the case of a foldable mobile terminal, a structure for folding a body and a support structure of a rear surface of a flexible display may conflict with each other or may be insufficient. Accordingly, a problem of reducing rigidity in a folded portion of the flexible display may occur.

SUMMARY

An aspect of the present disclosure is to solve the above-mentioned problems and other problems. Another aspect of the present disclosure is to provide a structure for folding or unfolding a mobile terminal and a structure for supporting a flexible display when unfolded, thereby providing a mobile terminal having higher rigidity at a hinge portion.

In addition, another aspect of the present disclosure is to provide a mobile terminal that is not easily damaged even by external impact by increasing the rigidity of a hinge assembly.

A mobile terminal according to an embodiment of the present disclosure may include a first body, a second body configured to be rotatable relative to the first body, a flexible display continuously disposed on the first body and the second body, and a hinge assembly configured to move the first body and the second body between a first state in which the first body and the second body are disposed in parallel to each other and a second state in which the first body and the second body are disposed to face each other, wherein the hinge assembly includes a pair of body rotators disposed to be spaced apart from each other in a width direction of the first body and the second body, a support bridge disposed between the pair of body rotators to connect the body rotators to each other, and a display support disposed to overlap with the support bridge in a width direction of the first body and the second body, and configured to be movable in connection with the movement of the support bridge, and the display support is disposed to support the flexible display in the first state, and moved to be spaced apart from the flexible display in the second state.

Furthermore, according to an embodiment, the support bridge may be horizontally disposed in the first state, and vertically disposed in the second state, and the display support may be disposed between the support bridges in the first state, and moved to be disposed under the support bridge in the process of switching to the second state.

Furthermore, according to an embodiment, the display support may be disposed between the first body and the second body to support the flexible display in the first state.

Furthermore, according to an embodiment, the display support may include a first plate disposed to be elongated at the center, a second plate disposed to have a larger width than the first plate at both ends of the first plate, and extend to be adjacent to the body rotator, and a third plate disposed between the first plate and the second plate to have a larger width than the second plate.

Furthermore, according to an embodiment, the mobile terminal may further include a sub-plate disposed under the second plate, and provided with a hook groove concave therein, wherein the display support further includes a hook portion extending to a lower portion of the third plate, and having a hook protruding toward the hook groove at an end thereof, and the display support is configured such that the hook portion is caught in the hook groove to move integrally with the sub-plate.

Furthermore, according to an embodiment, the support bridge may include a bridge portion disposed to be elongated in a width direction of the first body and the second body, a connection portion extending toward the display support at both ends of the bridge portion, and a support portion bent to extend from the connection portion so as to support a lower surface of the third plate in the first state, and switched to the second state to rotate so as to press an upper surface of the third plate.

Furthermore, according to an embodiment, the hinge assembly may include a hinged decor disposed on a rear surface of the display support, and both ends of the hinged decor may be disposed under the connection portion of the support bridge in the first state, and a hook portion of the display support may be supported at a central portion in the second state.

Furthermore, according to an embodiment, the support bridge may rotate together with the body rotator in the process of switching between the first state and the second state, and the third plate may be composed of two or more surfaces to which the upper and lower surfaces are connected to allow the support portion to be easily rotated in the process of switching the state of the support bridge between the first state and the second state.

A mobile terminal according to an embodiment of the present disclosure may include a first body, a second body configured to be rotatable relative to the first body, a flexible display integrally disposed on the first body and the second body, and a hinge assembly configured to move the first body and the second body between a first state in which the first body and the second body are disposed in parallel to each other and a second state in which the first body and the second body are disposed to face each other, wherein the hinge assembly includes a pair of body rotators disposed to be spaced apart from each other in a width direction of the first body and the second body, a pair of slot bodies disposed between the pair of body rotators, and configured to rotate together with the body rotators, a support bridge disposed between the pair of slot bodies to connect the spaced apart slot bodies to each other, and a display support disposed to overlap with the support bridge in a width direction of the first body and the second body, and configured to be movable in connection with the movement of the support bridge, and the display support is disposed to support the flexible display in the first state, and moved to be spaced apart from the flexible display in the second state.

Furthermore, according to an embodiment, the mobile terminal may further include a holding unit for free-stopping the body rotator in the process of switching the state of the hinge assembly between the first state to the second state, wherein the holding unit includes a moving cam, one end of which is supported by the slot body, and a spring, one end of which is supported by the moving cam, and the other end of which is supported by the support bridge, and the moving cam is rotated as the slot body is rotated from the first state to the second state to press the spring, and as compressed, the spring presses the slot body and the support bridge, respectively, to reduce additional rotation.

Furthermore, according to an embodiment, the support bridge may further include a support bridge binding portion surrounding at least part of the body rotator and the slot body to be coupled to each other.

Furthermore, according to an embodiment, the support bridge binding portion may include a first surface surrounding one surface of the slot body, a second surface bent from the first surface to surround one surface of the slot body adjacent to the other surface of the slot body, and one surface of the body rotator, and a third surface bent from the second surface to surround one surface of the body rotator adjacent to the other surface of the body rotator.

Furthermore, according to an embodiment, the slot body may be configured to have a thickness capable of being in contact with the second surface from an end portion of the first surface within the support bridge binding portion, and the body rotator may include a protruding portion protruding from one side thereof so as to be in contact with the second surface.

Furthermore, according to an embodiment, the mobile terminal may further include a coupling pin disposed between the first and third surfaces, and inserted through the slot body and the body rotating body.

Furthermore, according to an embodiment, the support bridge binding portion may further include a fourth surface bent from the first surface, and configured to surround another surface of the slot body, and a fifth surface bent from the fourth surface, and configured to surround still another surface of the slot body.

As described above, a display support of a mobile terminal according to an embodiment of the present disclosure may support a flexible display when the mobile terminal is in a first state. Accordingly, a rear space of the flexible display may be supported between a first body and a second body in the first state, thereby allowing the flexible display to be stably disposed without being pushed back even when the flexible display is pressed or touched.

In addition, the display support may be spaced apart from the flexible display in a second state, and accordingly, unnecessary pressure does not occur at a folded portion of the flexible display in the second state in which the first body and the second body are folded, and a third plate of the display support may press a hinge decor, thereby preventing the hinge decor from being pushed inward by an external force in the second state.

BRIEF DESCRIPTION OF THE DRAWINGS

FIGS. 2A through 3B are views showing a mobile terminal according to an embodiment of the present disclosure.

DETAILED DESCRIPTION

Hereinafter, a mobile terminal associated with the present disclosure will be described in detail with reference to the accompanying drawings.

Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning. A suffix "module" and "unit" used for constituent elements disclosed in the following description is merely intended for easy description of the specification, and the suffix itself does not give any special meaning or function.

Figure 1:
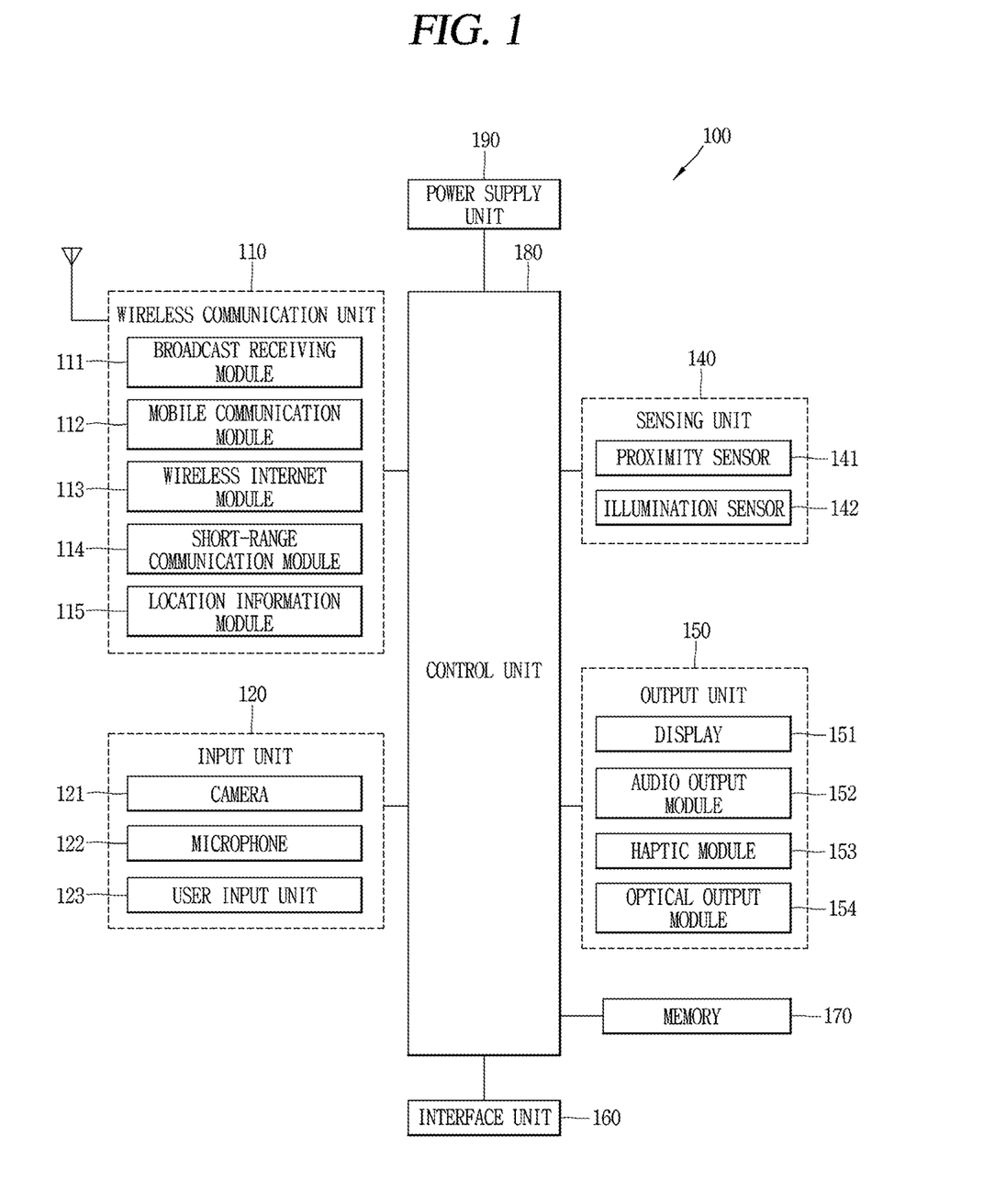
FIG. 1 is a block diagram showing a mobile terminal associated with an embodiment of the present disclosure.
Figure 2A:
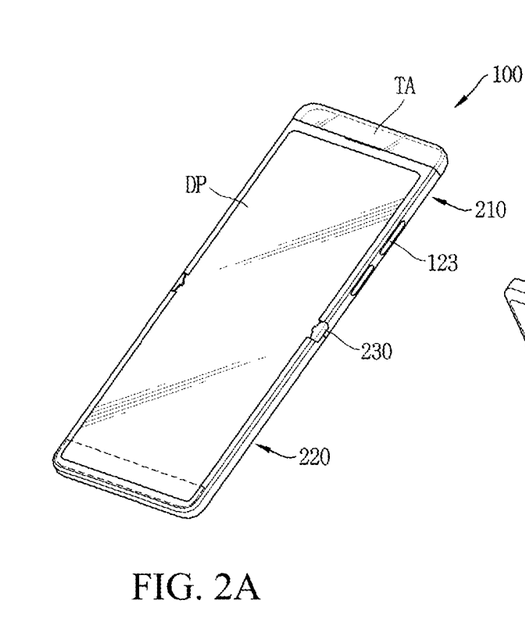
Figure 2B:
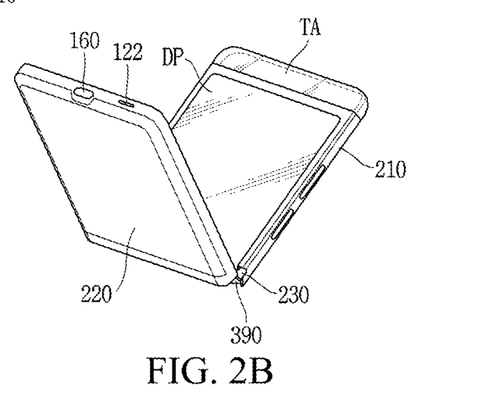
Figure 2C:
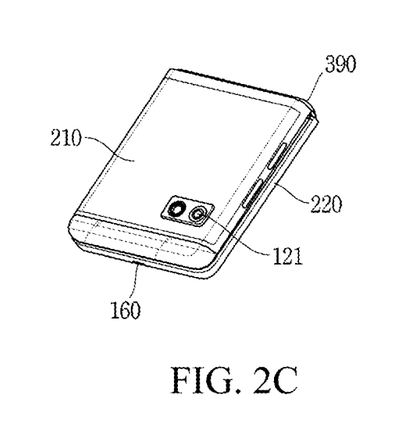
Figure 3A:
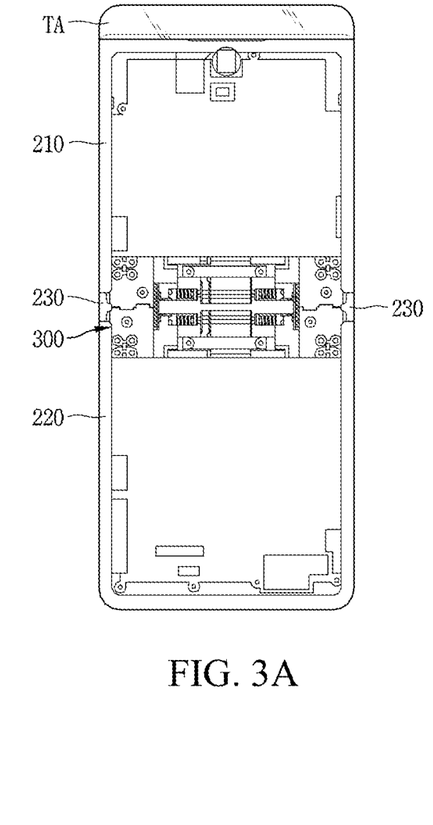
Figure 3B:
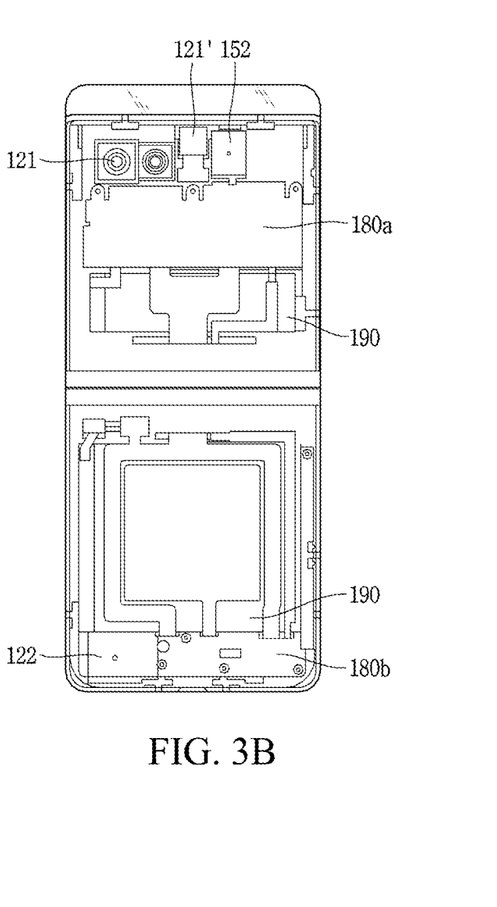

FIG. 1 is a block diagram showing a mobile terminal 100 associated with an embodiment of the present disclosure. FIGS. 2 through 3 are views showing a mobile terminal according to an embodiment of the present disclosure.

The mobile terminal 100 may include a wireless communication unit 110, an audio/video (A/V) input unit 120, a user input unit 123, a sensing unit 140, an output unit 150, a memory 170, an interface unit 160, a controller 180, a power supply unit 190, and the like. However, the constituent elements as illustrated in FIG. 1 are not necessarily required, and the mobile terminal 100 may be implemented with greater or less number of elements than those illustrated elements.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 170.

The mobile communication module 112 transmits and receives wireless signals to and from at least one a base station, an external terminal and a server on a mobile communication network. Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Referring to FIGS. 1 and 2, the A/V (audio/video) input unit 120 receives an audio or video signal, and the A/V (audio/video) input unit 120 may include a camera 121 and a microphone 122. The camera 121 processes a image frame, such as still picture or video, acquired by an image sensor in a video phone call or image capturing mode. The processed image frame may be displayed on a display module 151.

The image frames processed by the camera 121 may be stored in the memory 170 or transmitted to an external device through the wireless communication unit 110. Two or more cameras 121 may be provided according to the use environment of the mobile device. Specifically, referring to FIG. 2C, the camera 121 may be provided in a region exposed to an outside of a first body 210. In addition, referring to FIGS. 3A and 3B, a second camera 121' may be further provided on an inner side surface of the first body.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may include assorted noise removing algorithms to remove noise generated in the course of receiving the external audio signal.

The user input unit 123 may generate input data to control an operation of the terminal. The user input unit 123 may be configured by including a keypad, a dome switch, a touch pad (pressure/capacitance), a jog wheel, a jog switch, and the like. Specifically, as shown in FIG. 2A, the user input unit 123 may be provided as a key button.

The sensing unit 140 detects a current status of the mobile terminal 100 such as a location of the mobile terminal 100, an orientation of the mobile terminal 100, and the like, and an acceleration/deceleration of the mobile terminal 100 to generate a sensing signal for controlling the operation of the mobile terminal 100. Furthermore, the sensing unit 140 may sense whether or not the interface unit 160 is coupled to an external device or the like.

On the other hand, the sensing unit 140 may further include a proximity sensor 141 and an illuminance sensor 142, an acceleration sensor 143, and a gyro sensor 144.

The output unit 150 is configured to provide an output for audio signal, video signal, or alarm signal, and the output unit 150 may include the display module 151, an audio output module 152, an alarm 153, a haptic module 154, and the like.

The display module 151 displays (outputs) information processed by the mobile terminal 100. For example, when the mobile terminal 100 is in a phone call mode, the display module 151 may display a user interface (UI) or a graphic user interface (GUI) associated with a call. When the mobile terminal 100 is in a video call mode or image capturing mode, the display module 151 may display a captured and/or received image, a UI or GUI.

The display module 151 may be implemented using one or more suitable display devices. Examples of such suitable display devices include a liquid crystal display (LCD), a thin film transistor-liquid crystal display (TFT-LCD), an organic light emitting diode (OLED), a flexible display, and a 3-dimensional (3D) display.

Some of those displays may be configured with a transparent or optical transparent type to allow viewing of the exterior through the display module, which may be called transparent displays. An example of the typical transparent displays may include a transparent LCD (TOLED), and the like. A rear structure of the display module 151 may also be configured with a light transmission type. Under this configuration, the user can view an object positioned at a rear side of the terminal body through a region occupied by the display module 151 of the terminal body.

Two or more display modules 151 may be implemented according to a configured aspect of the mobile terminal 100. For instance, a plurality of the display modules may be arranged on one surface to be spaced apart from or integrated with each other, or may be arranged on different surfaces on the mobile terminal 100.

When the display module 151 and a touch sensitive sensor (hereinafter, referred to as a "touch sensor") have an interlayer structure (hereinafter, referred to as a "touch screen"), the display module 151 may be used as an input device rather than an output device. The touch sensor may be implemented as a touch film, a touch sheet, a touch pad, and the like.

The touch sensor may be configured to convert changes of a pressure applied to a specific part of the display module 151, or a capacitance occurring from a specific part of the display module 151, into electric input signals. Also, the touch sensor may be configured to sense not only a touched position and a touched area, but also a touch pressure.

When there is a touch input to the touch sensor, a signal (signals) corresponding thereto may be transmitted to a touch controller. The touch controller may process the received signals, and then transmit corresponding data to the controller 180. Accordingly, the controller 180 may sense which region of the display module 151 has been touched.

Referring to FIG. 1, a proximity sensor 141 may be disposed at an inner region of the mobile terminal 100 covered by the touch screen, or adjacent to the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 170, in a call-receiving mode, a call-placing mode, a recording mode, a voice recognition mode, a broadcast reception mode, and so on. The audio output module 152 may output an audio signal associated with a function (e.g., a call signal reception sound, a message reception sound, etc.) performed in the mobile terminal 100. The audio output module 152 may include a receiver, a speaker, a buzzer, and so on.

The alarm 153 outputs a signal notifying the occurrence of an event in the mobile terminal 100. The example of an event occurred from the mobile terminal 100 may include call received, message received, key signal input, touch input, and so on. The alarm 153 may output not only video or audio signals, but also other types of signals such as signals notifying the occurrence of events in a vibration manner. Since the video or audio signals may be output through the display module 151 or the audio output unit 152, the display module 151 and the audio output module 152 may be classified as part of the alarm 153.

A haptic module 154 may generate various tactile effects the that user may feel. A representative example of the tactile effects generated by the haptic module 154 includes vibration. Vibration generated by the haptic module 154 may have a controllable intensity, a controllable pattern, and so on. For example, different vibrations may be output in a synthesized manner or in a sequential manner.

Besides vibration, the haptic module 154 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 154 may be configured to transmit tactile effects through a user's direct contact, or a user's muscular sense using a finger or a hand. Two or more haptic modules 154 may be provided according to the particular configuration of the mobile terminal 100.

The memory 170 can store programs to support operations of the controller 180 and store input/output data (for example, phonebook, messages, still images, videos, etc.). The memory 170 may store data related to various patterns of vibrations and sounds outputted upon the touch input on the touch screen.

The memory 170 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in connection with a web storage device that performs the storage function of the memory 170 over the Internet.

The interface unit 160 serves as an interface for all external devices connected to the mobile terminal 100. For example, the interface unit 160 can receive data transmitted from an external device, receive power to transfer to elements and components within the mobile terminal 100, or transmit internal data of the mobile terminal 100 to such external device.

For example, as illustrated in FIG. 2C, the interface unit 160 may include wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. A device having the identification module (hereinafter, an "identification device") may be fabricated in the form of a smart card. Hence, the identification device may be connected to the mobile terminal 100 via a port.

When the mobile terminal 100 is connected to an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may be operated as signals for recognizing that the mobile terminal has accurately been mounted on the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Referring to FIGS. 3A and 3B, the controller 180 may include two controllers. For example, the controller 180 may include a main controller 180a and an auxiliary controller 180b. Through these two controllers, various operations of the mobile terminal may be performed more quickly and stably.

The controller 180 can perform a pattern recognition processing so as to recognize handwriting or drawing input performed on the touch screen as a text or image.

The power supply unit 190 may receive external or internal power to provide power required by various components under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 2A to 2C, a mobile terminal according to an embodiment of the present disclosure may include a first body, a second body configured to be rotatable relative to the first body, and a flexible display continuously disposed on the first body and the second body.

The mobile terminal 100 according to an embodiment of the present disclosure may include a first body 210 and a second body 220 configured to be rotatable relative to each other. In other words, it may be configured with a flexible display and a foldable mobile terminal 100. In this case, the mobile terminal 100 may be disposed in a first state in which the first body 210 and the second body 220 are disposed parallel to each other, and a second state in which the first body 210 and the second body 220 are disposed to face each other.

Specifically, FIG. 2A shows a first state in which the first body 210 and the second body 220 are disposed in parallel to each other, that is, an unfolded state. FIG. 2C shows a second state in which the first body 210 and the second body 220 are disposed to face each other, that is, a folded state. FIG. 2B is a transition state in which the first body 210 and the second body 220 are switched to each other from the first state to the second state.

Referring to FIGS. 2A to 2C, when the mobile terminal 100 is in the first state, a transparent area (TA) may be provided on the front surface. The transparent area (TA) is a portion that can be visually recognized from the outside even in the second state, and a lower area of the flexible display in FIG. 2A may be visually recognized from the outside.

A flexible display integrally configured with the first body 210 and the second body 220 may be disposed on the first body 210 and the second body 220. Furthermore, a front side decor 230 may be disposed between the first body 210 and the second body 220 for a finish of a space between the first body 210 and the second body 220 in the first state.

A hinge decor 390 which will be described later may be disposed behind the front side decor 230. The hinge decor 390 serves to shield a space generated as the first body 210 and the second body 220 change from the first state to the second state. A hinge assembly 300 may be disposed inside the hinge decor 390 described above.

Referring to FIGS. 3A and 3B, the hinge assembly 300 may be disposed between the first body 210 and the second body 220. The hinge assembly 300 is rotatably configured to allow the first body 210 and the second body 220 to achieve the first state and the second state. The hinge assembly 300 will be described in detail below.

Figure 4A:
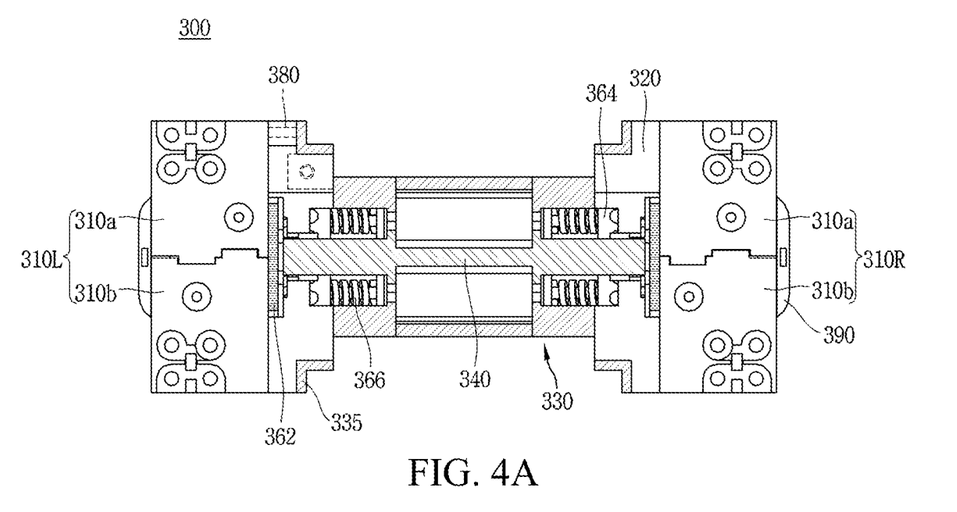
FIGS. 4A and 4B are views for explaining a hinge assembly of the mobile terminal illustrated in FIGS. 3A and 3B.
Figure 4B:
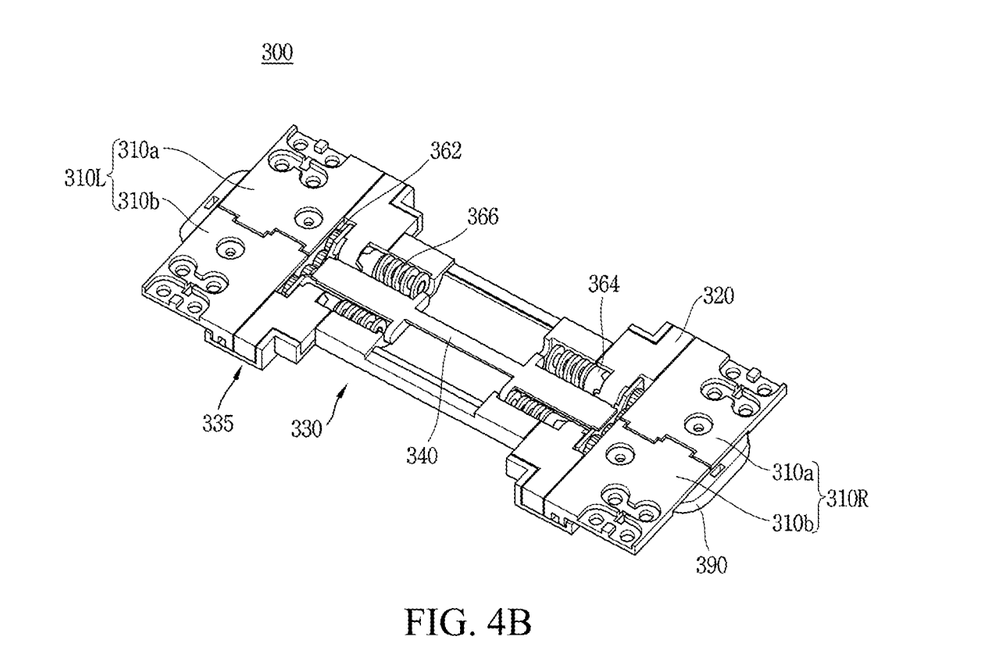
Figure 5:
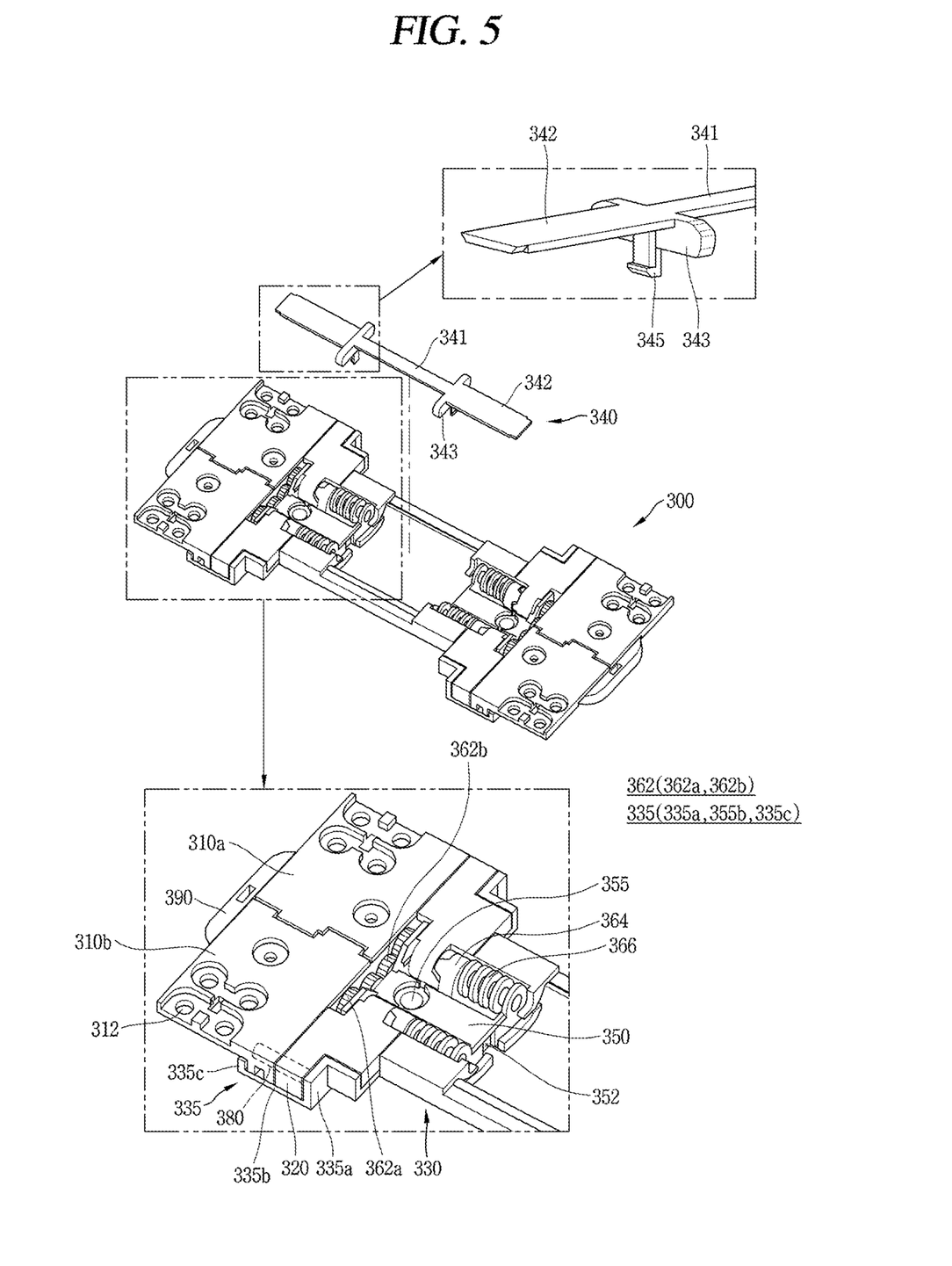
FIG. 5 is a view showing a state in which a display support is separated from the hinge assembly illustrated in FIGS. 4A and 4B.
Figure 6A:
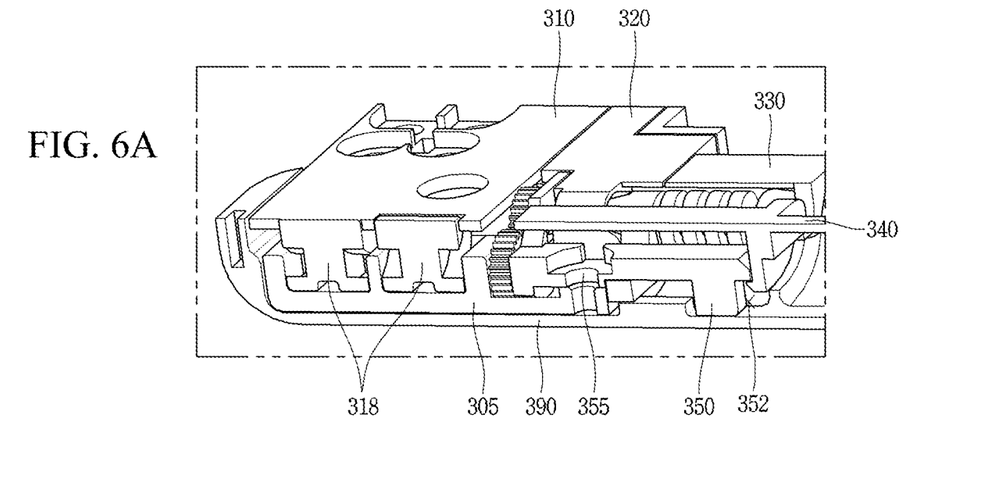
FIGS. 6A and 6B are views for explaining the hinge assembly illustrated in FIGS. 4A and 4B.
Figure 6B:
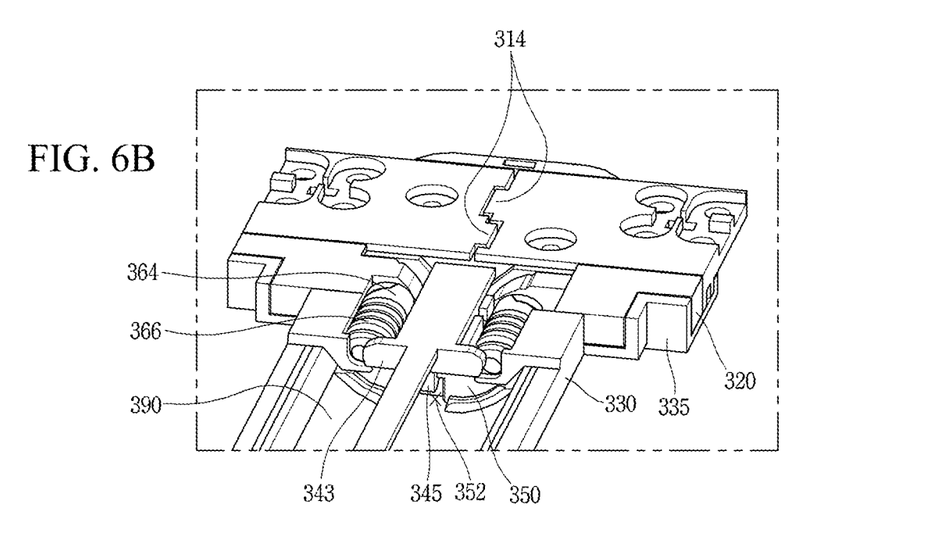
Figure 7:
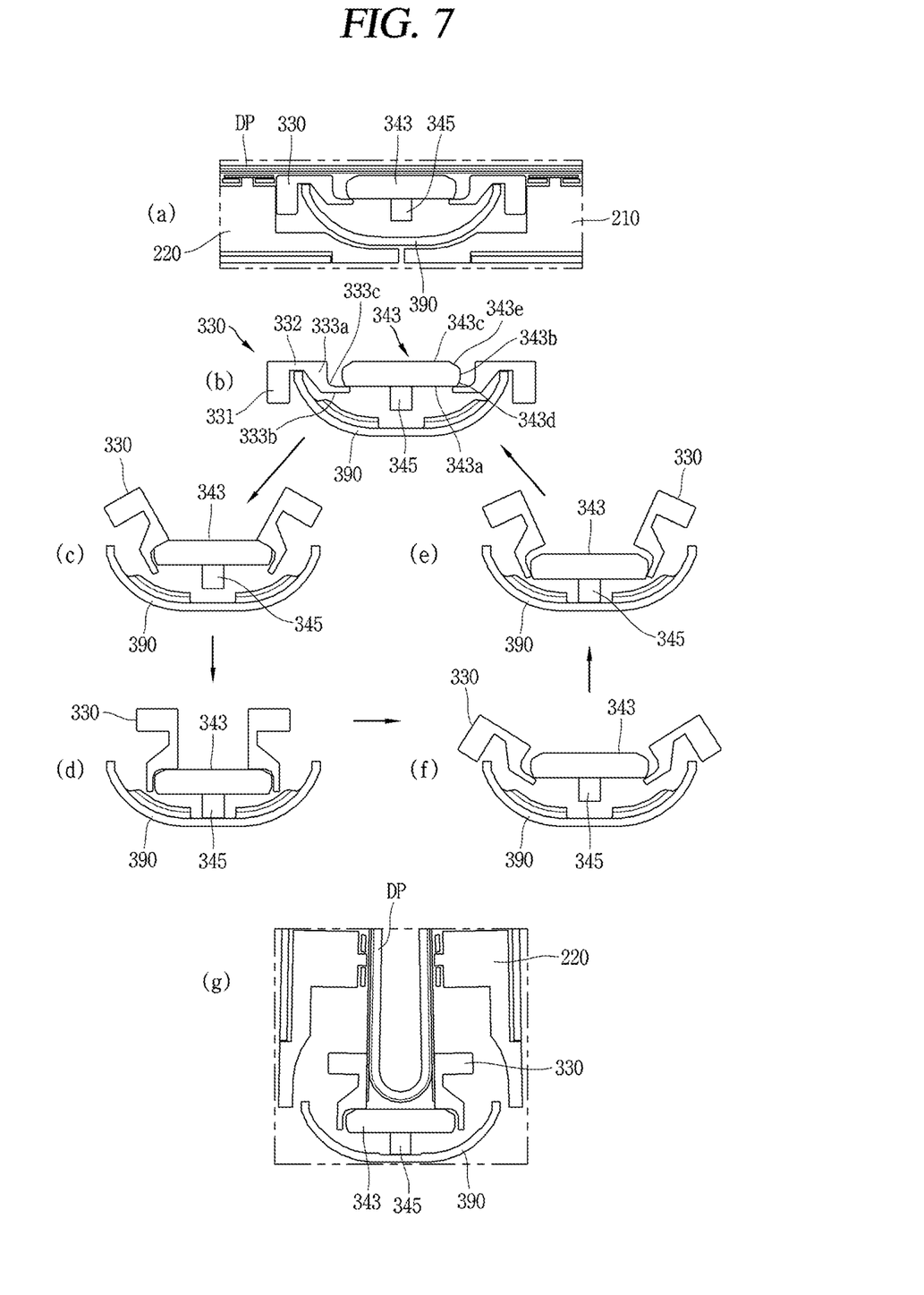
FIG. 7 is a view for explaining the movement of a support bridge and a display support in a first state and a second state in a hinge assembly according to an embodiment of the present disclosure.

FIGS. 4A and 4B are views for explaining a hinge assembly of the mobile terminal illustrated in FIGS. 3A and 3B. FIG. 5 is a view showing a state in which a display support is separated from the hinge assembly illustrated in FIGS. 4A and 4B. FIGS. 6A and 6B are views for explaining the hinge assembly illustrated in FIGS. 4A and 4B. FIG. 7 is a view for explaining the movement of a support bridge and a display support in a first state and a second state in a hinge assembly according to an embodiment of the present disclosure.

The hinge assembly 300 of the present disclosure includes a body rotator 310, a support bridge 330, and a display support 340.

(Body Rotator 310)

The body rotator 310 includes a pair of body rotators 310 disposed to be spaced apart from each other in a width direction of the first body 210 and the second body 220. The body rotator 310 is connected to the first body 210 and the second body 220. Specifically, the body rotator 310 may be connected to the first body 210 and the second body 220 by a coupling member (not shown) connected to a body rotator hole 312.

The body rotator 310 may include a left body rotator 310L and a right body rotator 310R. The body rotator 310 may be spaced apart from the first body 210 and the second body 220 in a width direction and coupled at both sides, thereby allowing the hinge assembly 300 to stably support the first body 210 and the second body 220 in the process of switching from the first state to the second state.

Each of the left body rotator 310L and the right body rotator 310R may include a first body rotator 310a connected to the first body 210 and a second body rotator 301b connected to the second body 220. In addition, a support frame 305 may be further provided at a lower end of the body rotator 310. Specifically, referring to FIGS. 4 and 6, the support frame 305 may be provided at the lower end of the body rotator 310.

The first body rotator 310a and the second body rotator 310b may rotate in engagement with each other. Specifically, referring to FIG. 6A, a rotating portion 318 is provided. The rotating portion 318 has a protrusion shape protruding downward so as to cross each other at the first body rotator 310a and the second body rotator 310b.

The rotating portion 318 may move on the support frame 305 in a process in which the body rotator 310 is mutually switched between a first state and a second state to guide the rotation of the body rotator 310.

Meanwhile, the first body rotator 310a and the second body rotator 310b may each have cross protrusions 314 that partially protrude toward each other. The cross protrusion 314 may also guide the first body rotator 310a and the second body rotator 310b to stably rotate with each other.

Meanwhile, referring to FIGS. 6A and 6B, the support frame 305 and a sub-plate 350 may be coupled to each other through a coupling hole 355. The sub-plate 350 will be described in detail later.

(Support Bridge 330)

The support bridge 330 is disposed between a pair of body rotators 310. The support bridge 330 connects the body rotators 310 to each other. Specifically, referring to FIGS. 4 and 5, the support bridge 330 may connect the body rotator 310 and/or the slot body 320 spaced apart from each other.

The support bridge 330 may be integrally coupled with the body rotator 310. Accordingly, the support bridge 330 may be rotated together as the body rotator 310 is rotated. In other words, the support bridge 330 is rotated together with the body rotator 310 in the process of switching states to each other between the first state and the second state.

At this time, the support bridge 330 may be horizontally disposed in the first state and vertically disposed in the second state. Specifically, referring to FIG. 7, the support bridge 330 may be disposed in a horizontal state in the first state as shown in (b) of FIG. 7. Furthermore, in the second state as shown in (d) of FIG. 7, the support bridge 330 may be disposed in a vertical state.

(Display Support 340)

The display support 340 is disposed to overlap with the support bridge 330 in a width direction of the first body 210 and the second body 220. Specifically, referring to FIG. 5, the display support 340 is disposed to overlap with the support bridge 330 in a width direction of the first body 210.

In addition, the display support 340 is configured to be movable in connection with the movement of the support bridge 330. Specifically, the display support 340 may move up and down as the support bridge 330 is switched from the first state to the second state.

For example, as shown in (b) of FIG. 7, the display support 340 is disposed between the support bridges 330 in the first state. Furthermore, as shown in (d) of FIG. 7, the display support 340 may be moved to be disposed under the support bridge 330 in the process of switching to the second state.

(Movement of Display Support 340)

The display support 340 is disposed to support the flexible display in the first state, and moved to be spaced apart from the flexible display in the second state.

Specifically, referring to (a) of FIG. 7, in the first state, the display support 340 is disposed between the first body 210 and the second body 220. In addition, the display support 340 may be disposed to support the flexible display from the rear surface.

Furthermore, referring to (g) of FIG. 7, in the second state, the display support 340 is moved in a direction of being spaced apart from the flexible display.

The display support 340 of the mobile terminal 100 according to an embodiment of the present disclosure supports the flexible display when the mobile terminal 100 is in the first state. Accordingly, a rear space of the flexible display may be supported between the first body 210 and the second body 220 in the first state, thereby allowing the flexible display to be stably disposed without being pushed back even when the flexible display is pressed or touched.

In addition, the display support 340 is spaced apart from the flexible display in the second state. Accordingly, in the second state in which the first body 210 and the second body 220 are folded, unnecessary pressure may not occur at a folded portion of the flexible display. Furthermore, the hinge decor 390 may be pressed by a third plate 343 of the display support 340, thereby preventing the hinge decor 390 from being pushed inward by an external force in the second state.

(Slot Body 320)

Meanwhile, referring to FIGS. 4A and 4B, it may further include a pair of slot bodies 320 disposed between a pair of body rotators 310 and configured to rotate together with the body rotators 310. The slot body 320 may be integrally coupled with the body rotators 310 and the support bridge 330.

(Structure of Display Support 340)

Referring to FIG. 5, the display support 340 may include a first plate 341, a second plate 342, and a third plate 343. The first plate 341 may be disposed to be elongated at the center.

The second plate 342 may have a larger width than the first plate 341 at both ends of the first plate 341. The second plate 342 must support the flexible display in the first state, and thus preferably has a larger width than the first plate 341. In addition, in this aspect, the second plate 342 may extend to be adjacent to the body rotator 310.

The third plate 343 is disposed between the first plate 341 and the second plate 342. The third plate 343 has a larger width than the second plate 342. The third plate 343 has the largest width.

The third plate 343 may be pressed upward and downward by the support 333 protruding from the support bridge 330. The third plate 343 may be disposed to have a large width to be connected to the support portion 333 protruding from the support bridge 330. Furthermore, in order to receive a pressure applied to the display support 340 by the support portion 333 of the support bridge 330, the third plate 343 has a predetermined thickness downward.

The display support 340 further includes a hook portion 345 extending to a lower portion of the third plate 343, and having a hook protruding toward a hook groove 352 at an end thereof Furthermore, it further includes a sub-plate 350 disposed under the second plate 342 and provided with the hook groove 352 concave therein. The display support 340 is configured such that the hook portion 345 is caught in the hook groove 352 to move integrally with the sub-plate 350.

(Structure of Support Bridge 330)

The support bridge 330 may include a bridge portion 331, a connection portion 332 and a support portion 333.

Figure 8:
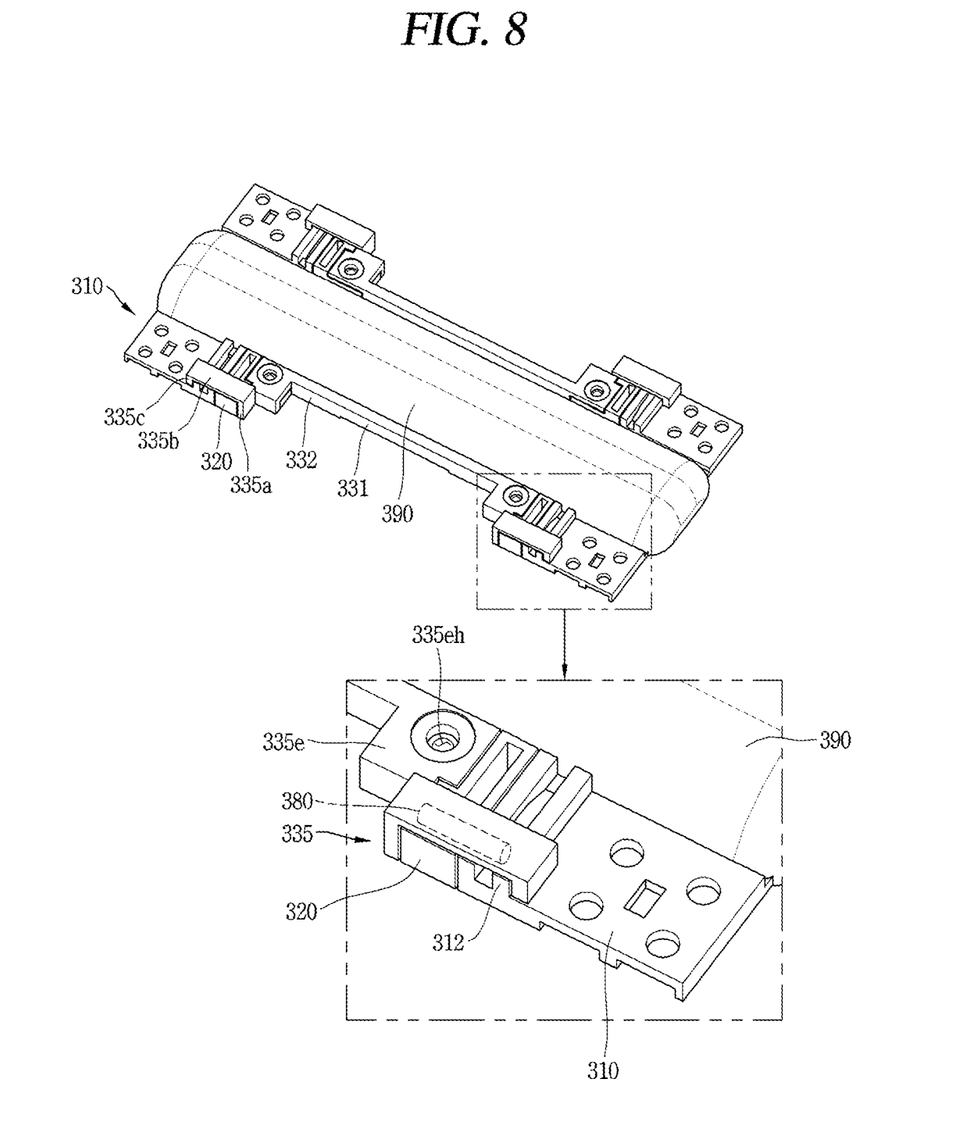
FIG. 8 is a view showing a rear surface of a hinge assembly to describe a support bridge according to an embodiment of the present disclosure.
Figure 9:
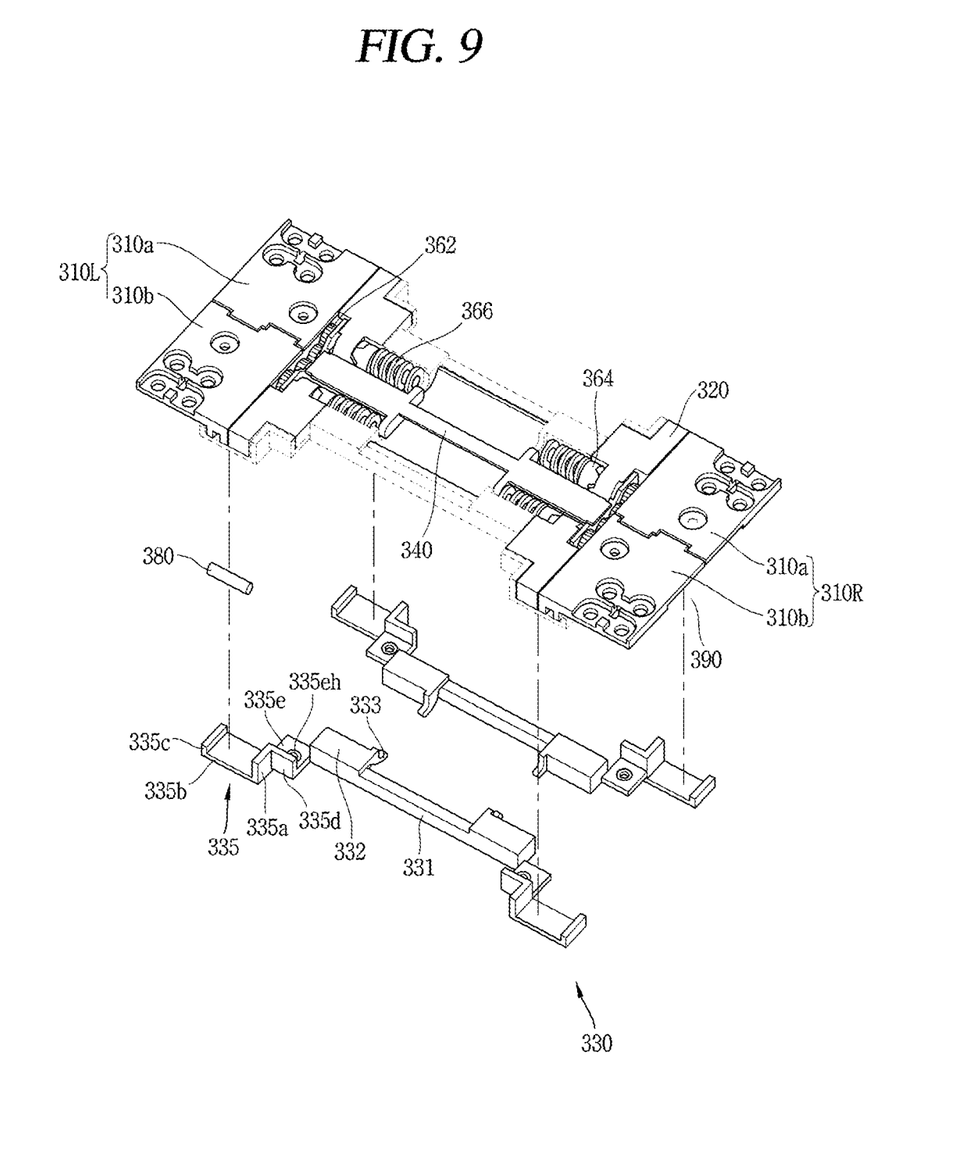
FIG. 9 is a view showing a state in which the support bridge is separated from the hinge assembly to describe the support bridge of the hinge assembly in FIG. 8.

Specifically, referring to FIGS. 7 to 9, the bridge portion 331 is disposed to be elongated in a width direction of the first body 210 and the second body 220. In addition, the connection portion 332 extends toward the display support 340 at both ends of the bridge portion 331.

Referring to FIG. 7, the support portion 333 is bent to extend from the connection portion 332 so as to support a lower surface of the third plate 343 in the first state, and is switched to the second state to rotate so as to press an upper surface of the third plate 343.

Specifically, referring to (b) of FIG. 7, the support portion 333 may include a first portion 333a extending downward from the connection portion 332, and a second portion 333b protruding from the first portion 333a toward the display support 340. A connection surface 333c defined as a curved line connecting the first portion 333a and the second portion 333b may be disposed.

(Description of Movement of Support Bridge 330 and Display Support 340)

As illustrated in (a) of FIG. 7, in the first state, a second surface 335b of the support portions 333 of the support bridge 330 may support a lower surface of the third plate 343 of the display support 340. Furthermore, the connection portion 332 of the support bridge 330 may be supported by the hinge decor 390.

Through this, even when the display support 340 is pressed downward, the display support 340 may be supported by the support of the support bridge 330 and the hinge decor 390.

(c) of FIG. 7 is a moving view of the support bridge 330 in the process of switching from the first state to the second state. As the support bridge 330 rotates, the connection surface 333c of the support bridge 330 may press an upper surface 343e of the third plate 343. The display support 340 may be moved downward by pressing the support bridge 330.

(d) of FIG. 7 is a state of being switched to the second state. The first portion 333a of the support bridge 330 may press an upper surface of the third plate 343 of the display support 340. Accordingly, even when the display support 340 is pressed from a side of the hinge decor 390 in the second state, it may be possible to reduce the hinged decor 390 from being moved inward.

(e) of FIG. 7 shows an initial stage of a process of switching from the second state to the first state. At this time, the display support 340 may move upward as the hinge decor 390 moves upward.

(f) of FIG. 7 is a late stage of a process of switching from the second state to the first state. At this time, the second portion 333b of the support bridge 330 may be inserted toward a lower surface of the display support 340.

(Hinge Decor 390)

The hinge assembly 300 may further include a hinge decor 390 disposed on a rear surface of the display support 340. Both ends of the hinge decor 390 may be disposed under the connection portion 332 of the support bridge 330 in the first state, and the hook portion 345 of the display support 340 may be supported at a central portion thereof in the second state.

Specifically, referring to FIGS. 6 and 8, the hinge decor 390 may be disposed on a rear surface of the hinge assembly 300. Furthermore, referring to FIG. 7, the hook portion 345 of the display support 340 may be supported in the second state.

(Description of Third Plate 343 of Support Bridge 330)

The third plate 343 may be composed of two or more surfaces to which upper and lower surfaces thereof are connected such that the support portion 333 is easily rotated in the process of switching the state of the support bridge 330 between the first state and the second state.

Specifically, referring to (b) of FIG. 7, the third plate 343 may include a lower surface 343a, a side surface 343b, an upper surface 343c and a lower side surface 343d and an upper side surface 343e connected to the lower surface 343a and the upper surface 343c. At this time, the upper surface 343e and the lower surface 343d of the third plate 343 may connect the side surface 343b of the third plate 343 to the upper surface 343c and the lower surface 343a of the third plate 343.

(Holding Unit)

The hinge assembly 300 may further include a holding unit for free-stopping the body rotator 310 in the process of switching from the first state to the second state.

Referring to FIG. 5, the holding unit includes a moving cam 364 supported by the slot body 320 at one end thereof, and a spring 366 supported by the moving cam 364 at one end thereof, and supported by the support bridge 330 at the other end thereof.

The moving cam 364 rotates as the slot body 320 rotates from the first state to the second state to press the spring 366. In other words, the moving cam 364 may rotate to move in a direction of pressing the spring 366. Accordingly, as compressed, the spring 366 may press the slot body 320 and the support bridge 330, respectively. As the spring 366 presses both the slot body 320 and the support bridge 330, an external force required for the rotation of the slot body 320 and the support bridge 330 may increase. Accordingly, when there is no external force, it may be configured to reduce additional rotation.

(Gear Portion 362)

Referring to FIG. 5, a gear portion 362 may be further included between the body rotator 310 and the slot body 320. The gear portion 362 may include a first gear portion 362a and a second gear portion 362b.

The first gear portion 362a may guide the slot body 320 to be switched in a vertical direction as it rotates. The second gear portion 362b may guide the sub-plate 350 to move downward.

FIG. 8 is a view showing a rear surface of a hinge assembly to describe a support bridge according to an embodiment of the present disclosure. FIG. 9 is a view showing a state in which the support bridge is separated from the hinge assembly to describe the support bridge of the hinge assembly in FIG. 8.

The support bridge 330 may further include a support bridge binding portion 335 surrounding at least part of the body rotator 310 and the slot body 320 so as to be coupled to each other.

(Support Bridge Binding Portion 335)

The support bridge binding portion 335 may include a first surface 335a, a second surface 335b, and a third surface 335c.

Specifically, referring to FIGS. 8 and 9, the first surface 335a surrounds one surface of the slot body 320. Furthermore, the second surface 335b is bent from the first surface 335a, and configured to surround one surface of the slot body 320 adjacent to the other surface of the slot body 320, and one surface of the body rotator 310. The third surface 335c is bent from the second surface 335b, and configured to surround one surface of the body rotator 310 adjacent to the other surface of the body rotator 310.

At this time, the first to third surfaces 335a to 335c of the support bridge binding portion 335 may be configured in a "U" shape. In addition, the slot body 320 and the body rotator 310 may be inserted into the support bridge binding portion 335.

The slot body 320 may be configured to have a thickness capable of being in contact with the second surface 335b from an end portion of the first surface 335a within the support bridge binding portion 335. Specifically, referring to FIG. 8, one end portion of the slot body 320 is disposed at the same position as the end portion of the first surface 335a. Furthermore, it may be disposed to have a thickness corresponding to an inner length of the first surface 335a so as to be in contact with an inside of the second surface 335b.

The body rotator 310 may include a protruding portion 312 protruding from one side thereof so as to be contact with the second surface 335b. Specifically, referring to FIGS. 8 and 9, the protruding portion 312 may protrude from a rear surface of the body rotator 310 toward the second surface 335b.

(Coupling Pin 380)

It may further include a coupling pin 380 disposed between the first surface 335a and the third surfaces 335c and inserted through the slot body 320 and the body rotator 310.

The coupling pin 380 may be inserted into a through hole (not shown) disposed in the slot body 320 and the body rotator 310 to integrally couple the slot body 320 and the body rotator 310. The coupling pin 380 may be disposed so as not to be released to the outside by the support bridge binding portion 335.

The support bridge binding portion 335 according to an embodiment of the present disclosure may be configured to integrally couple the body rotator 310, the slot body 320, and the support bridge 330. Furthermore, the integrity of the body rotator 310 and the slot body 320 may be increased through the coupling pin 380 passing through the body rotator 310 and the slot body 320.

Through this, even when an impact is applied to the hinge assembly 300 from the outside, it may be possible to reduce the hinge assembly 300 itself from being distorted or some components thereof from being released, thereby increasing the rigidity of the hinge assembly 300.

(Support Bridge Binding Portion 335—Fourth Surface 335d and Fifth Surface 335e)

Meanwhile, the support bridge binding portion 335 may further include a fourth surface 335d bent at the first surface 335a, and configured to surround another surface of the slot body 320, and a fifth surface 335e bent at the fourth surface 335d to surround still another surface of the slot body 320.

Specifically, referring to FIG. 9, the support bridge binding portion 335 may include the fourth surface 335d surrounding another surface in which the slot body 320 is not in contact with the first to third surfaces 335a to 335c, and the fifth surface 335e surrounding a surface of the slot body 320 crossing the fourth surface 335d.

In addition, a through hole 335eh capable of coupling to a groove disposed in the slot body 320 may be disposed on the fifth surface 335e. As the coupling member is inserted through the through hole 335eh, the slot body 320 and the support bridge 330 may be more firmly coupled to each other.

The support bridge binding portion 335 according to an embodiment of the present disclosure may be configured to integrally couple the body rotator 310, the slot body 320, and the support bridge 330. Furthermore, the integrity of the body rotator 310 and the slot body 320 may be increased through the coupling pin 380 passing through the body rotator 310 and the slot body 320.

Moreover, the support bridge binding portion 335 may include the fourth surface 335d, the fifth surface 335e surrounding a surface of the slot body 320, and the through hole 335eh for coupling, thereby further increasing a coupling force between the support bridge 330 and the slot body 320.

The foregoing detailed description should not be construed as restrictive but considered as illustrative in all aspects. The scope of the invention should be determined by reasonable interpretation of the appended claims and all changes that come within the equivalent scope of the invention are included in the scope of the invention.

What is claimed is:

1. A mobile terminal, comprising:
   a first body;
   a second body configured to be rotatable relative to the first body;
   a flexible display disposed on the first body and the second body; and
   a hinge assembly configured to adjust the first body and the second body to (i) a first state in which the first body and the second body are disposed in parallel to each other or (ii) a second state in which the first body and the second body are disposed to face each other,
   wherein the hinge assembly comprises:
      a plurality of body rotators disposed to be spaced apart from each other in a width direction of the first body and the second body,
      a support bridge disposed between the plurality of body rotators to connect each of the plurality of body rotators, and
      a display support that is disposed to overlap with the support bridge in the width direction of the first body and the second body and that is configured to be movable in connection with a movement of the support bridge,
   wherein the display support is configured to support the flexible display in the first state and is configured to be spaced apart from the flexible display in the second state, and
   wherein the display support comprises:
      a first plate disposed to be elongated at a center of the display support,
      a second plate that is disposed at both ends of the first plate and that extends to be adjacent to the body rotator, and
      a third plate that is disposed between the first plate and the second plate and that has a width greater than a width of the second plate.

2. The mobile terminal of claim 1, wherein:
   the support bridge is horizontally disposed in the first state, and vertically disposed in the second state,
   the support bridge includes a plurality of bridges, and
   the display support is disposed between the plurality of bridges in the first state and is configured to move below the plurality of bridges in a process of switching to the second state.

3. The mobile terminal of claim 2, wherein the display support is disposed between the first body and the second body to support the flexible display in the first state.

4. The mobile terminal of claim 1,
wherein the second plate has a width greater than a width of the first plate.

5. The mobile terminal of claim 1, further comprising:
a sub-plate that is disposed below the second plate and that includes a hook groove concave,
wherein the display support further comprises a hook portion extending to a lower portion of the third plate, the hook portion including a hook that protrudes toward the hook groove, and
wherein the display support is configured such that the hook portion is inserted into the hook groove to move integrally with the sub-plate.

6. The mobile terminal of claim 5, wherein the support bridge comprises:
a bridge portion disposed to be elongated in a width direction of the first body and the second body;
a connection portion extending toward the display support at both ends of the bridge portion; and
a support portion that is angled to extend from the connection portion to support a lower surface of the third plate in the first state and that is rotated to press an upper surface of the third plate in the second state.

7. The mobile terminal of claim 6, wherein the hinge assembly comprises:
a hinged decor disposed at a rear surface of the display support,
wherein both ends of the hinged decor are disposed below the connection portion of the support bridge in the first state, and
wherein a hook portion of the display support is supported at a central portion of the hinge decor in the second state.

8. The mobile terminal of claim 6, wherein:
the support bridge is configured to rotate with the body rotator in a process of switching between the first state and the second state, and
the third plate defines two or more surfaces to which the upper and lower surfaces of the third plate are connected to allow the support portion to rotate in a process of switching a state of the support bridge between the first state and the second state.

9. A mobile terminal, comprising:
a first body;
a second body configured to be rotatable relative to the first body;
a flexible display integrally disposed on the first body and the second body; and
a hinge assembly configured to adjust the first body and the second body to (i) a first state in which the first body and the second body are disposed in parallel to each other or (ii) a second state in which the first body and the second body are disposed to face each other,
wherein the hinge assembly comprises:
a plurality of body rotators disposed to be spaced apart from each other in a width direction of the first body and the second body,
a plurality of slot bodies that is disposed between the plurality of body rotators and that is configured to rotate with the plurality of body rotators,
a support bridge disposed between the plurality of slot bodies to connect the plurality of slot bodies to each other, and
a display support that is disposed to overlap with the support bridge in a width direction of the first body and the second body and that is configured to be movable in connection with a movement of the support bridge,
wherein the display support is disposed to support the flexible display in the first state and is configured to be spaced apart from the flexible display in the second state,
wherein the support bridge further comprises a support bridge binding portion surrounding at least part of the body rotator and the slot body to be coupled to each other, and
wherein the support bridge binding portion comprises:
a first surface surrounding a first surface of the slot body,
a second surface that is angled from the first surface to surround (i) a second surface of the slot body adjacent to the first surface of the slot body and (ii) a first surface of the body rotator, and
a third surface that is angled from the second surface to surround a second surface of the body rotator adjacent to the first surface of the body rotator.

10. The mobile terminal of claim 9, further comprising:
a holding unit configured to control the body rotator in a process of switching a state of the hinge assembly between the first state to the second state,
wherein the holding unit comprises:
a moving cam supported by the slot body at a first end, and
a spring supported by the moving cam at a first end and supported by the support bridge at a second end,
wherein the moving cam is configured to rotate, based on the slot body being rotated from the first state to the second state, to press the spring, and
wherein the spring is configured to press, based on the spring being compressed by the moving cam, the slot body and the support bridge, respectively, to reduce additional rotation.

11. The mobile terminal of claim 9, wherein:
the slot body has a thickness capable of being in contact with the second surface of the support bridge binding portion from an end portion of the first surface of the support bridge binding portion, and
the body rotator comprises a protruding portion protruding from a first side of the body rotator to be in contact with the second surface of the support bridge binding portion.

12. The mobile terminal of claim 11, further comprising:
a coupling pin that is disposed between the first and third surfaces of the support bridge binding portion and that is inserted through the slot body and the body rotating body.

13. The mobile terminal of claim 9, wherein the support bridge binding portion further comprises:
a fourth surface that is angled from the first surface of the support bridge binding portion and that surrounds a third surface of the slot body, and
a fifth surface that is angled from the fourth surface of the support bridge binding portion and that surrounds a fourth surface of the slot body.

14. The mobile terminal of claim 13, wherein the fifth surface of the support bridge binding portion defines a through hole into which a coupling member is inserted to couple the slot body and the support bridge.

15. The mobile terminal of claim 12, wherein the slot body and the body rotator define a through hole into which the coupling pin is inserted to integrally couple the slot body and the body rotator.

16. The mobile terminal of claim 9, further comprising:
a gear portion disposed between the plurality of body rotator and the plurality of slot bodies.

17. The mobile terminal of claim 16, wherein the gear portion comprises:
a first gear portion configured to guide, based on the slot body rotating, the slot body to be switched in a vertical direction, and
a second gear portion.

18. The mobile terminal of claim 17, wherein the display support comprises:
a first plate disposed to be elongated at a center of the display support,
a second plate that is disposed at both ends of the first plate, that has a width greater than a width of the first plate, and that extends to be adjacent to the body rotator,
a third plate that is disposed between the first plate and the second plate and that has a width greater than the width of the second plate, and
a sub-plate that is disposed below the second plate,
wherein the second gear portion is configured to guide the sub-plate to move downward.

* * * * *